(12) United States Patent
Martinez Perez-Beato

(10) Patent No.: US 10,081,964 B2
(45) Date of Patent: Sep. 25, 2018

(54) WIND TOWER CONNECTION SYSTEM

(71) Applicant: DYWIDAG SISTEMAS CONSTRUCTIVOS, S.A., Fuenlabrada, Madrid (ES)

(72) Inventor: Fernando Martinez Perez-Beato, Madrid (ES)

(73) Assignee: DYWIDAG SISTEMAS CONSTRUCTIVOS, S.A., Fuenlabrada, Madrid (ES)

(*) Notice: Subject to any disclaimer, the term of this patent is extended or adjusted under 35 U.S.C. 154(b) by 0 days.

(21) Appl. No.: 15/418,993

(22) Filed: Jan. 30, 2017

(65) Prior Publication Data
US 2017/0218651 A1 Aug. 3, 2017

(30) Foreign Application Priority Data

Feb. 2, 2016 (EP) .................................... 16382041

(51) Int. Cl.
*E04H 12/16* (2006.01)
*E04H 12/08* (2006.01)
*E02D 27/42* (2006.01)

(52) U.S. Cl.
CPC ........... *E04H 12/16* (2013.01); *E02D 27/425* (2013.01); *E04H 12/085* (2013.01)

(58) Field of Classification Search
CPC ...... E02D 27/425; E04H 12/085; E04H 12/16
See application file for complete search history.

(56) References Cited

U.S. PATENT DOCUMENTS

| 5,586,417 A * | 12/1996 | Henderson | E02D 27/42 405/233 |
| 5,809,711 A * | 9/1998 | Werner | E01D 2/00 52/223.2 |
| 9,096,985 B1 * | 8/2015 | Phuly | E02D 27/42 |
| 2002/0124502 A1 * | 9/2002 | Henderson | E02D 27/42 52/296 |
| 2003/0000165 A1 * | 1/2003 | Tadros | E04C 3/22 52/223.4 |
| 2004/0148880 A1 * | 8/2004 | Hayes | E04C 5/12 52/223.1 |

(Continued)

FOREIGN PATENT DOCUMENTS

| CN | 104532871 A | 4/2015 |
| DE | 19901510 A1 | 8/2000 |

OTHER PUBLICATIONS

European Search Report for corresponding European Application No. 16382041. (dated Jul. 4, 2016)(2 Pages).

*Primary Examiner* — James M Ference
(74) *Attorney, Agent, or Firm* — Lucas & Mercanti, LLP

(57) ABSTRACT

The invention introduces a connection system for connecting a shaft of a wind tower to a support surface, by means of a shaft, a foundation cage and a plurality of pairs of tendons wherein each tendon has a lower anchoring adapted for the placement thereof inside the foundation, an upper anchoring, at least one strand with a first end and a second end, the strand extending from the upper anchoring to the lower anchoring, a pair of sleeves for each strand, a sleeve fixed to the upper anchoring and a sleeve fixed to the lower anchoring, each sleeve housing a segment of the strand. Additionally, the system introduces a method for connecting a shaft of a wind tower to a support surface.

15 Claims, 4 Drawing Sheets

(56) References Cited

U.S. PATENT DOCUMENTS

| | | | |
|---|---|---|---|
| 2007/0028557 A1* | 2/2007 | Kelly | E02D 27/34 52/741.15 |
| 2007/0181767 A1* | 8/2007 | Wobben | E02D 27/42 248/346.01 |
| 2007/0251187 A1* | 11/2007 | Schiffer | E02D 27/42 52/741.14 |
| 2009/0000227 A1* | 1/2009 | Jakubowski | E04H 12/085 52/223.4 |
| 2010/0132270 A1* | 6/2010 | Willey | E02D 27/38 52/79.5 |
| 2010/0154318 A1* | 6/2010 | Shockley | E04B 5/43 52/82 |
| 2011/0061321 A1* | 3/2011 | Phuly | E02D 27/42 52/297 |
| 2012/0047830 A1* | 3/2012 | Phuly | E02D 27/42 52/294 |
| 2012/0070233 A1* | 3/2012 | Wang | E02D 27/42 405/232 |
| 2012/0167499 A1* | 7/2012 | Knisel | F03D 13/22 52/231 |
| 2013/0255169 A1* | 10/2013 | Henderson | E04C 5/125 52/223.13 |
| 2014/0033628 A1* | 2/2014 | Lockwood | E04H 12/16 52/223.5 |
| 2014/0150359 A1* | 6/2014 | Werner | E04H 12/085 52/223.5 |
| 2014/0255106 A1* | 9/2014 | Henderson | E02D 27/12 405/256 |
| 2015/0096240 A1* | 4/2015 | Arlab N Gabeiras | E04H 12/342 52/40 |
| 2015/0143765 A1* | 5/2015 | Carril Gonzalez | F03D 11/045 52/296 |
| 2015/0330077 A1* | 11/2015 | Stracke | E04H 12/16 52/173.1 |
| 2015/0376859 A1* | 12/2015 | Phuly | F03D 13/22 52/223.1 |
| 2017/0218651 A1* | 8/2017 | Martinez Perez-Beato | E04H 5/12 |

\* cited by examiner

WIND TOWER CONNECTION SYSTEM

CROSS-REFERENCE TO RELATED APPLICATIONS

This application claims the benefit of European Patent Application No. 16382041.8 filed Feb. 2, 2016, the contents of which are incorporated herein by reference.

OBJECT OF THE INVENTION

The present invention relates to the construction of wind towers, more specifically to the connection between the shaft of said wind tower and the support surface on which the tower is supported.

BACKGROUND OF THE INVENTION

The connection between the metal shaft of a wind tower and the foundation where said shaft is supported is usually carried out by means of an active reinforcement, made up of steel bars or pins embedded in the foundation. These bars or pins are intended for fitting into holes of mounting flanges comprised in the shaft. Therefore, said bars or pins must be installed with a great mounting precision, because otherwise the flange of the metal shaft will not be able to be threaded through same. This operation takes up a lot of mounting times, in addition to requiring significant auxiliary means which allow installing said bars with suitable tolerances of millimeters. Said auxiliary means comprise installing annular templates which allow mounting and installing said system of bars.

On the other hand, this system makes it necessary to drill the mounting flanges comprised in the shafts, thereby weakening their bearing capacity and increasing their price.

There are designs of connection systems between the foundation and the shaft, the only difference of which lies in the type of active reinforcement to be used. In other words, instead of steel bars or pins, tendons of unbonded strand are used. These designs make threading of the steel shaft on the mounting flange easier since the system of non-adherent strand is somehow more flexible, but it does not solve the problem since mounting tolerances of millimeters is still required and furthermore, the flexibility which is favorable in certain form to be able to adjust the position of the standby reinforcement, in this case strands, becomes unfavorable since the position of said standby strands is not always the same. This makes it necessary to use auxiliary mounting systems to be able to suitably install the non-adherent strands.

The present invention describes a connection system preventing the mentioned drawbacks, providing a connection between the shaft of the wind tower and the surface supporting it that is easier to mount than the earlier solutions as it is less sensitive to geometrical errors, in turn complying with the suitable tolerances. Additionally, the service life of said connection also increases.

DESCRIPTION OF THE INVENTION

The present invention describes a connection system of a shaft of a wind tower according to claim 1 and a method for connecting said shaft of a wind tower according to claim 11. The dependent claims define preferred embodiments of the invention.

The first inventive aspect relates to a connection system for connecting a shaft of a wind tower to a support surface comprising a foundation, said system comprising:
a shaft comprising:
a post with a first face and a second face, and a fixing end, the post being configured to be placed vertically on the support surface,
a plurality of pairs of bolts distributed such that each bolt of each pair of bolts is fixed on either the first face or second face of the post,
a flange located in the fixing end of the post and adapted for being fixed on the support surface,
a plurality of pairs of tendons, each tendon comprising:
a lower anchoring adapted for the placement thereof inside the foundation,
an upper anchoring,
at least one strand with a first end and a second end, the strand extending from the upper anchoring to the lower anchoring,
a pair of sleeves for each strand, a sleeve fixed to the upper anchoring and a sleeve fixed to the lower anchoring, each sleeve housing a segment of the strand, and
a foundation cage covering at least a part of each strand and of the upper anchoring, embedding the pairs of bolts.

The shaft of the wind tower comprises a post with a fixing end. Said fixing end is located, through a flange, on the support surface on which the wind tower is installed. Said flange allows both the levelling and fixing of the shaft to the support surface. Advantageously, the flange does not have through holes, so it has greater bearing capacity in turn lowering its price.

In a preferred example, the post is a metal post.

The plurality of bolts comprised in the shaft of the wind tower is distributed in pairs on both faces of the post, and said bolts are in turn distributed in a segment of the post along the longitudinal direction of said post according to a plurality of planes transverse to said longitudinal direction.

The bolts of each transverse plane are in turn distributed along the perimeter around the post.

In a preferred example, the bolts are metal bolts.

Both the bolts and the flange are fixed to the post, welded thereto in a preferred example, if they are metal bolts and flange.

The connection system according to the first inventive aspect further comprises a plurality of tendons. Said tendons form the connection between the shaft of a wind tower with the support surface, and are preferably unbonded post-stressed tendons. The number of tendons varies depending on the external requirements of the shaft.

The tendons compress the shaft of the wind tower against the foundation, such that a correct connection of the tower is assured and the possible stresses causing the tower to topple when it is subject to wind are compensated for.

Advantageously, making the connection by means of said plurality of tendons allows obtaining broader mounting tolerances because the distribution of said tendons is more flexible than other types of connection. The connection system is therefore less sensitive to geometrical errors, the resulting system being more robust and reliable.

In a preferred example, said distribution is a uniform distribution of the total number of tendons in the entire perimeter of the shaft.

Each tendon comprises at least one strand. In a preferred example, the number of strands forming a tendon is between 1 and 7.

In the case of unbonded tendons, the at least one strand is sheathed and greased or waxed. This in turn allows protecting the strand against corrosion increasing its durability and eliminating the need for maintenance.

In a preferred embodiment, a strand is formed by a plurality of wires, said wires preferably being made of steel.

Each tendon further comprises a lower anchoring and an upper anchoring. The lower anchoring is a passive anchoring, as it is embedded in the foundation comprised in the support surface, so it is not in contact with the environment, which increases its durability and eliminates the need for maintaining said anchoring.

The tendon also comprises a pair of sleeves for each strand, which allows adjusting the strand and the anchoring, providing continuity. Additionally, the sleeves assure that no section of the strand is unprotected.

The foundation cage of the connection system is made of concrete and covers the bolts completely and each strand together with the upper anchoring at least partially, so said upper anchoring is an active anchoring.

In the case of non-adherent tendons, the strand does not come into contact with the concrete or with the environment, so it does not wear off.

Advantageously, the arrangement of tendons partially covered by the foundation cage allows compressing the concrete of said cage, such that the pulling force produced when the shaft of the wind tower tends to topple is compensated for.

Additionally, the foundation cage is connected to the shaft by means of the concrete, and prevents said shaft from sliding.

The advantage of the distribution of the bolts inside the concrete has on the wind tower is the provision of a connection allowing a better stress transmission between the shaft and the concrete, given that said bolts collaborate in the adherence between these two elements. The concrete therefore is not separated from the shaft.

In a preferred embodiment, the connection system further comprises a mortar bed adapted for being located between the fixing end of the flange and the support surface.

This advantageously allows levelling the shaft on the support surface, maintaining said levelling and therefore the suitable position of the shaft on the support surface, such that the verticality of said shaft is assured.

The mortar bed acts as an interface between the shaft and the support surface, such that the contact of these two elements through the bed is assured.

The mortar bed is preferably made up of a self-levelling mortar.

In a preferred example, the connection system comprises at least one upper anchoring or lower anchoring comprising:
  at least one distribution plate comprising a perforation for each strand, the sleeve being housed in said perforation,
  at least one wedge plate comprising at least one hole housing the first end or second end of the strand, the wedge plate being located on the at least one distribution plate such that each perforation coincides with each hole,
  at least one wedge housed in the hole which allows fixing the end of the strand to the wedge plate,
  at least one retention plate located on the at least one wedge plate, which has projecting therefrom the end of the strand and which retains the at least one wedge, and
  at least one sealing gasket which allows fixing the at least one retention plate to the at least one wedge plate.

According to whether it is a lower or an upper anchoring, anchoring is completely or partially covered by concrete.

The distribution plate allows transmitting the force of the concrete at least partially covering the anchoring towards the at least one strand.

The wedge plate houses the at least one wedge present in the anchoring, which wedge allows fixing the strand in its ideal position. This wedge plate is fixed or supported on the distribution plate.

The wedges and the strand are adjusted by means of the sleeve continuously.

Once the anchoring is mounted, the at least one strand projects through the end where the retention plate is located.

In a preferred embodiment, at least one upper anchoring or lower anchoring further comprises a cap covering the end of the strand projecting from the at least one retention plate.

Said cap is preferably made of plastic and protects the end of the strand from wearing off.

In a preferred embodiment, at least one tendon of the connection system further comprises a helix partially surrounding a strand.

This helix allows confining the concrete covering partially or completely the anchoring of the tendon. This makes it more resistant, since the helix acts as reinforcement.

In a preferred example, the helix is fixed to the at least one distribution plate on a face opposite the face where the at least one wedge plate is fixed.

The helix is therefore fixed to the anchoring, which allows confining the concrete more effectively.

The connection obtained between the shaft of the wind tower to be installed and the support surface available provides a gasket that is compressed at all times, and a force transmission by direct compression to the flange and by shearing force to the post.

The second inventive aspect relates to a method for connecting a shaft of a wind tower to a support surface, comprising the following steps:
  providing an excavation on the support surface adapted for making a foundation,
  providing a system according to the first inventive aspect,
  fixing the lower anchoring of the at least one tendon into the excavation,
  pouring concrete into the excavation, the foundation being obtained,
  locating the shaft on the foundation,
  locating the upper anchoring together with the end of the strand in their final position of connection,
  making the foundation cage, and
  stressing the at least one tendon.

First, both an excavation and a connection system are provided.

In a preferred example, an excavation which in turn comprises a rebar is provided.

Once placed in their position, the pairs of tendons are in turn fixed to the rebar of the excavation through the lower anchorings. This allows the fixing to be robust enough and to withstand the stresses the tendons are subjected to due to the connection with the foundation.

In a preferred example, there is provided an excavation in which a concrete comprising fibers is added. The excavation further comprises an auxiliary reinforcement, which allows the anchoring of the tendons once the concrete together with the fibers forms the foundation.

In a preferred embodiment, the tendons are totally mounted before being placed in their position and fixed to the rebar or to the auxiliary reinforcement of the foundation.

The next step comprises adding the concrete to the excavation, once the lower anchorings have been fixed in said excavation. The lower anchorings are therefore embedded by the concrete of the excavation.

In this preferred example, the assembly of excavation, concrete and rebar or fibers form the foundation.

The shaft is then located on the foundation and the upper end of each of the tendons is located in the suitable position thereof defined by the final position of connection in which all the elements are fixed.

To fix said positions, a formwork giving rise to the foundation cage is made. Said foundation cage maintains the position of the shaft, as well as that of each of the tendons.

In a particular example, the formwork also comprises rebar or fibers, to which the upper anchorings of the tendons are fixed.

In a particular embodiment, the foundation cage allows an operator to enter the space defined inside the shaft.

Finally, the at least one tendon is stressed. This is achieved by means of applying a pulling force to each of the strands of each tendon.

In a particular embodiment, said pulling force is applied symmetrically along the distribution of the different strands of each tendon.

Once all the tendons have been stressed, the excess of each strand is cut and the mounting of each upper anchoring is completed.

In a particular example, the pulling force is applied by means of a jack.

In a particular example, once the excesses of the strands have been cut, the caps are mounted on the protruding ends of the upper anchorings for protection.

In a particular embodiment, the connection method comprises the step of making a mortar bed between the flange and the support surface after the step of locating the shaft on the foundation.

Advantageously, this allows suitably levelling the shaft on the support surface, such that the suitable position of the shaft in the connection is assured when making the foundation cage.

In a particular embodiment, the step of locating the upper anchoring together with the end of the strand comprises the steps of:
  placing the tendon and the at least one distribution plate, and
  placing the at least one wedge plate and the at least one wedge.

In this case, the at least one distribution plate of each upper anchoring is located before pouring the concrete of the foundation cage and once this has set and has sufficient strength, both the wedge plate and the wedges are placed such that the tendons are fixed to the foundation cage.

All the features and/or the steps of the methods described in this specification (including the claims, description and drawings) can be combined in any combination, with the exception of the combinations of such mutually exclusive features.

DESCRIPTION OF THE DRAWINGS

The foregoing and other features and advantages of the invention will be more clearly understood based on the following detailed description of a preferred embodiment given only by way of illustrative and non-limiting example in reference to the attached drawings.

DETAILED DESCRIPTION OF THE INVENTION

Figure 1:
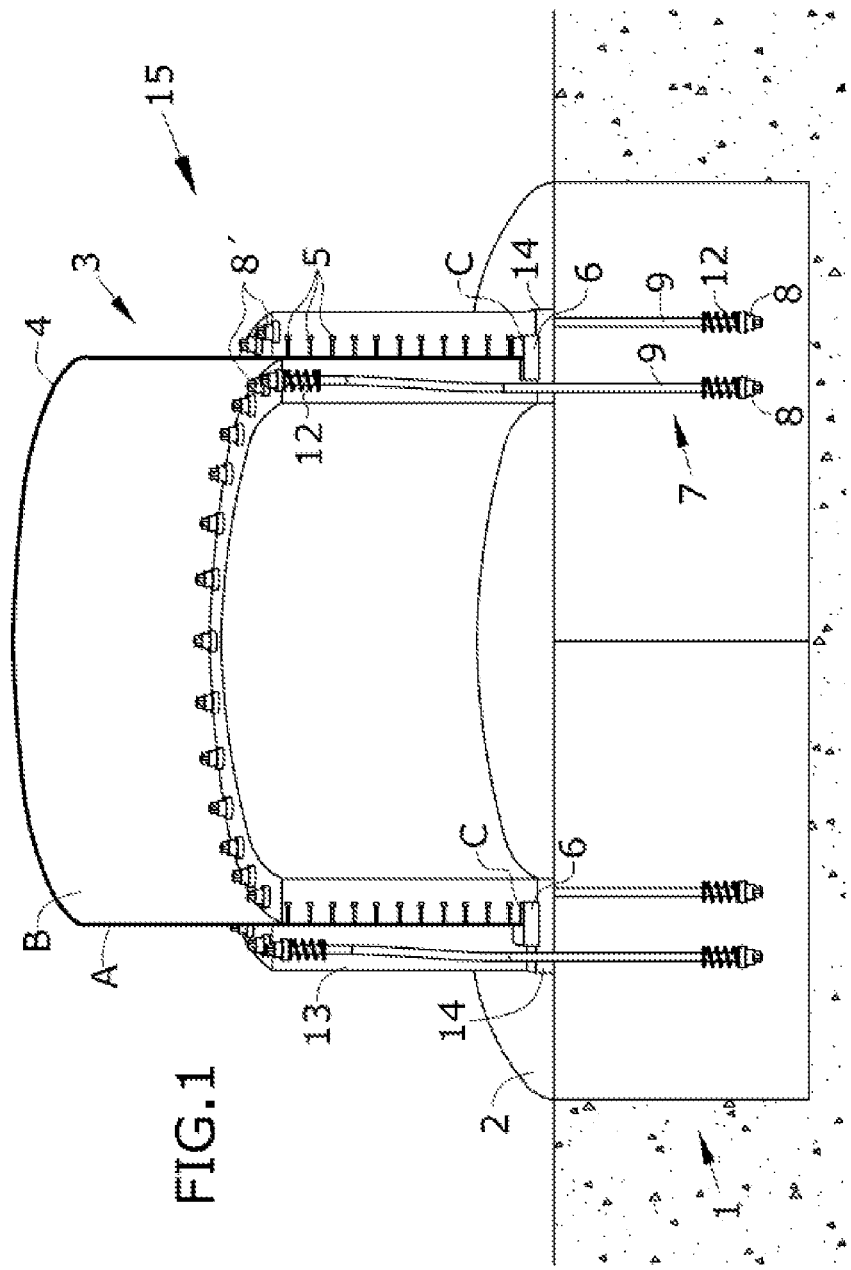
FIG. 1 shows a section in perspective view of a shaft of a wind tower connected to a support surface by means of a connection system according to one embodiment.

FIG. 1 shows a connection system (15) for connecting a shaft (3) of a wind tower to a support surface (1) according to a preferred embodiment.

Said support surface (1) comprises a foundation (2) made of concrete and a metal rebar (not shown in the drawing).

A mortar bed (14) is arranged on the foundation (2) and a flange (6) belonging to the shaft (3) of the wind tower is arranged thereon.

The flange (6) is located in the fixing end (C) of the post (4), both the post (4) and the flange (6) being metal post and flange.

The post (4) defines a first face (A) and a second face (B), in this case the second face (B) being the inner face of the post (4) and the first face (A) the outer face of said post (4) as seen in FIG. 1.

The shaft (3) also comprises a series of pairs of bolts (5) distributed in the lower area of the post (4). These bolts (5) are metal bolts and are distributed in pairs on both faces (A, B) in a segment of the post (4) according to the longitudinal direction thereof. Each of the pairs of bolts (5) is in turn arranged on a plane transverse to said longitudinal direction of the post (4), thereby being located along the entire perimeter of the post (4), in this case circular.

Each of the bolts (5) is welded to the post (4), as well as the flange (6).

As seen in FIG. 1, the connection system (15) has about a total of 60 tendons (7), uniformly distributed throughout the section of the post (4).

In this preferred example, the tendons (7) are completely embedded in concrete, either in the foundation (2) like the case of the lower anchorings (8) and part of the strands (9) or in the foundation cage (13) like the case of another part of the strands (9) and of part of the upper anchorings (8').

In this case, the upper anchorings (8') are not completely embedded in the concrete.

As seen in FIG. 1, both the lower anchorings (8) and the upper anchorings (8') have associated therewith a helix (12) surrounding the strand (9) in a segment.

Figure 2:
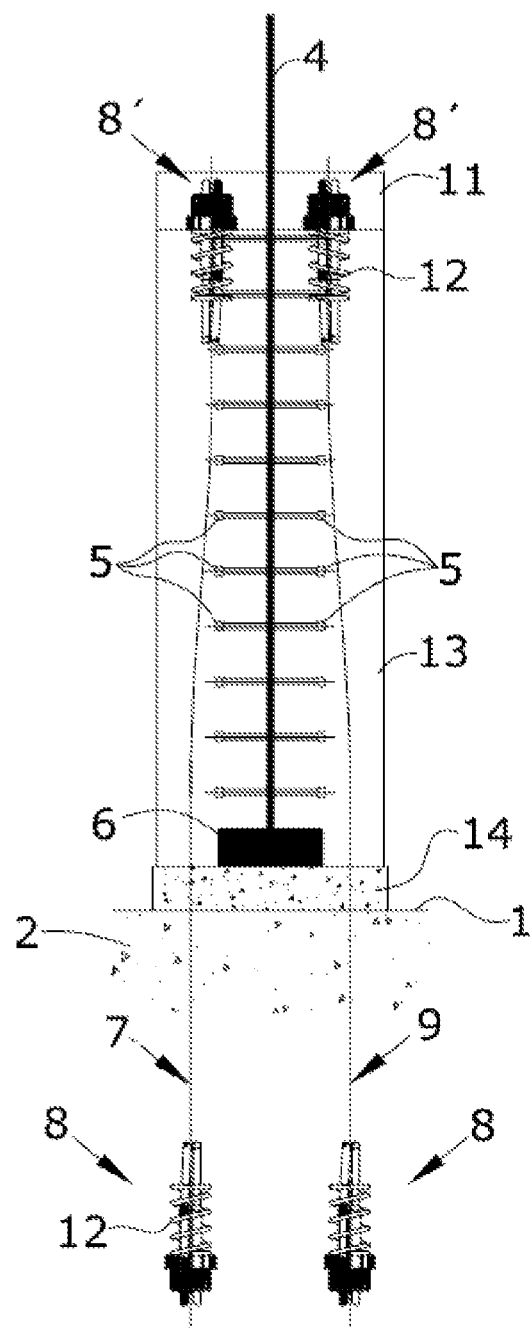
FIG. 2 shows a longitudinal section of a pair of tendons of a connection system according to the preceding figure.

FIG. 2 shows a pair of tendons (7) which are already mounted such that the connection between the shaft (3) and the support surface (1) is established.

In this case, the two lower anchorings (8) are embedded in the concrete of the foundation (2), and anchored to the rebar thereof (not shown in the drawings).

The strands (9) are in turn embedded in the concrete of the foundation (2) as well as in the concrete of the foundation cage (13).

At the other end of each tendon (7), the upper anchorings (8') are fixed to the rebar of the foundation cage (not shown in the drawings), and partially covered by the concrete thereof. The segment of said upper anchorings (8') outside the foundation cage (13) is covered by a seal (11) protecting the end of the tendon (7) from external aggressions.

In this case, the strands (9) are made of steel and are non-adherent strands, so they are sheathed and greased throughout their entire length. They are furthermore surrounded by helixes (12) at their ends.

Figure 3:
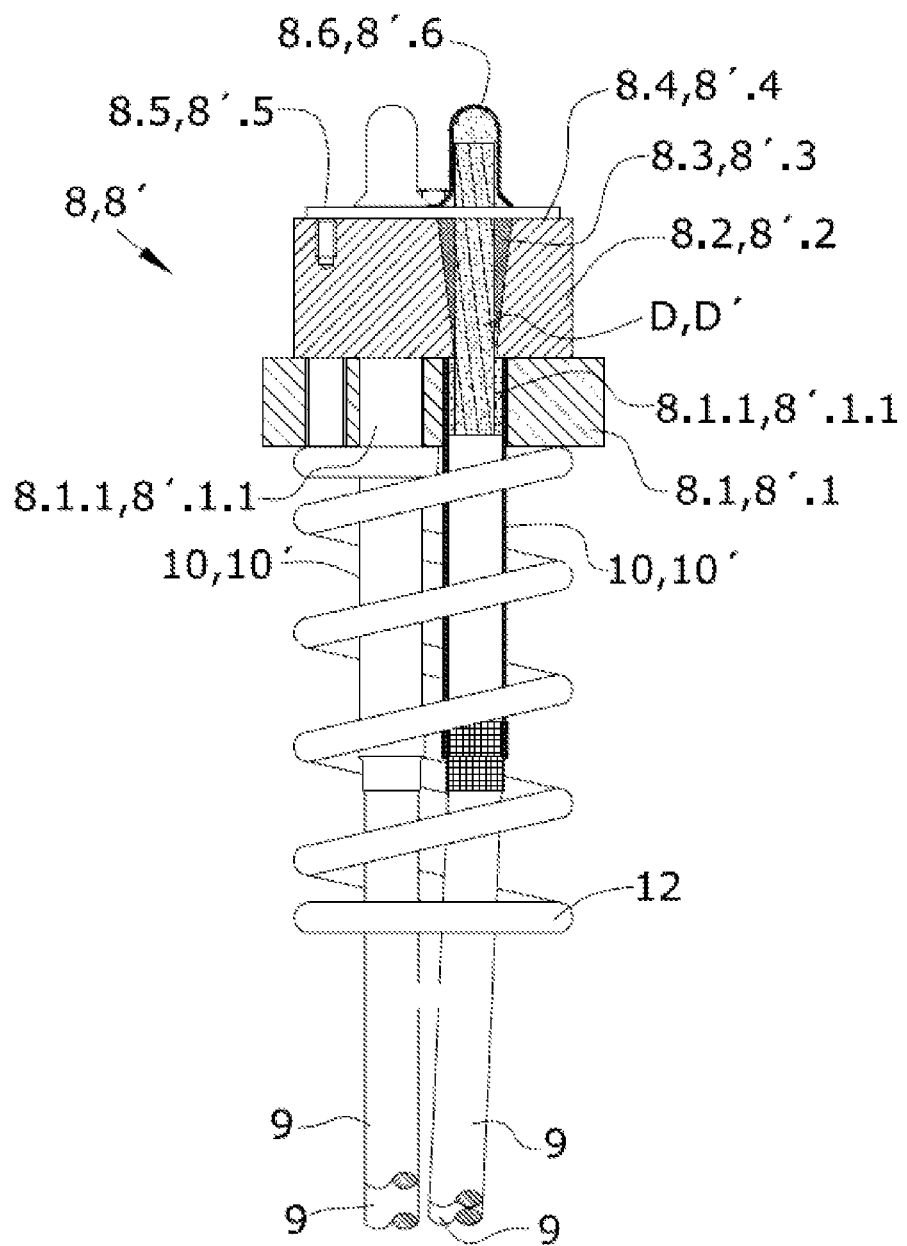
FIG. 3 shows a section of an upper anchoring or a lower anchoring according to one embodiment.

FIG. 3 shows a detail of one of the upper and lower anchorings (8, 8'), comprising a distribution plate (8.1, 8'.1) and a wedge plate (8.2, 8'.2) as well as wedges (8.3, 8'.3).

Each of the strands (9) is sheathed and greased or waxed in the sleeves (10, 10') protecting same. Said sleeves (10, 10') are in turn surrounded by a helix (12) fixed on the distribution plate (8.1, 8'.1).

Both the distribution plate (8.1, 8'.1) and the wedge plate (8.2, 8'.2) located thereon have holes (8.1.1, 8'.1.1) axially coinciding in the mounting with the strands (9) going therethrough.

Each of the strands (9) is fixed to the wedge plate (8.2, 8'.2) through metal wedges (8.3, 8'.3) maintaining the position of the ends (D, D') of said strands (9).

A retention plate (8.5, 8'.5) preventing the wedges (8.3, 8'.3) from changing their position is arranged on the wedge plate (8.2, 8'.2) and protecting the segment protruding from the ends (D, D') of said strands (9).

A sealing gasket (8.4, 8'.4), allowing said retention plate (8.5, 8'.5) to maintain its position is arranged between the retention plate (8.5, 8'.5) and the wedge plate (8.2, 8'.2).

The excess segment of each strand (9) projecting from the retention plate (8.5, 8'.5) is covered by a plastic cap (8.6, 8'.6) protecting it.

This segment is covered once the tendons (7) have been stressed through each of their strands (9) and the excess has been cut.

Figure 4:
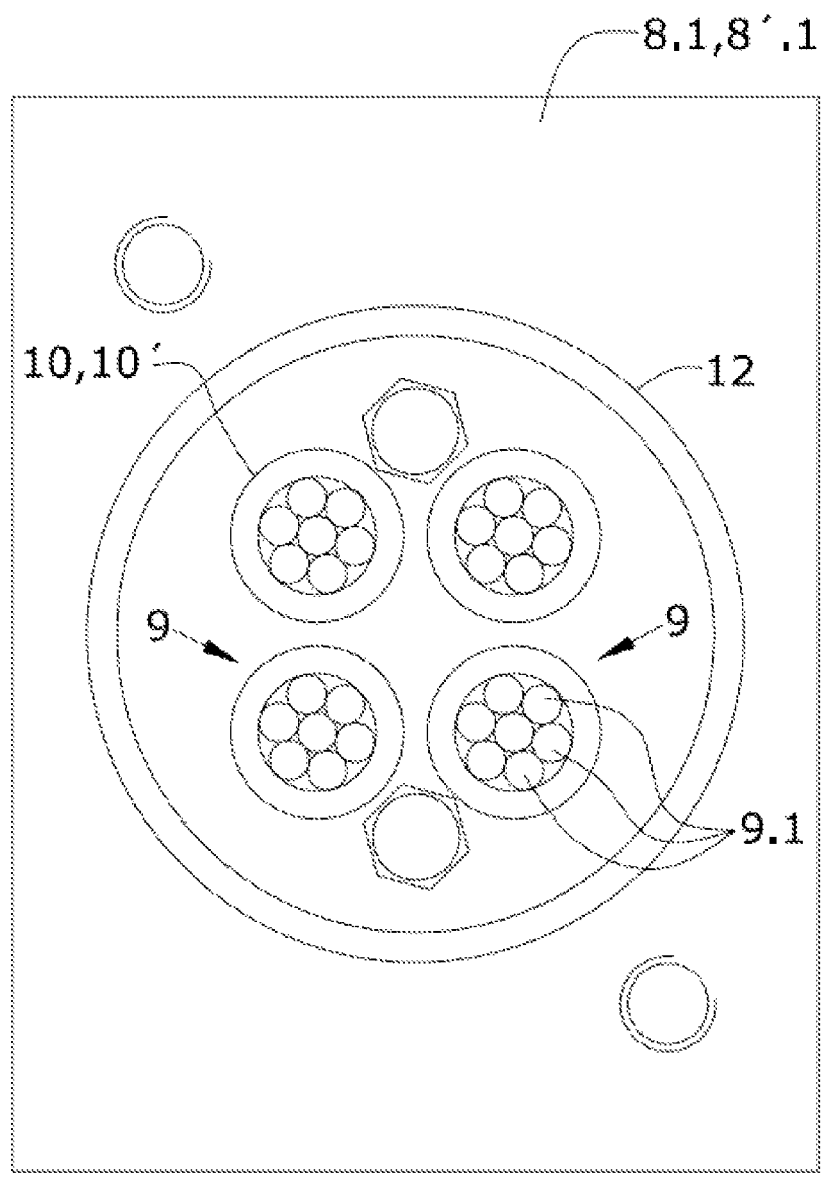
FIG. 4 shows a plan view of a connection system according to one embodiment.

FIG. 4 shows the plan view of a lower or upper anchoring (8, 8') illustrating therein a distribution plate (8.1, 8'.1) and a tendon (7) arranged thereon made up of 4 strands (9), each strand (9) being made up of 7 wires (9.1).

These strands (9) are sheathed in their sleeves (10, 10'), and all of them are housed inside the helix (12).

The invention claimed is:

1. A connection system for connecting a shaft of a wind tower to a support surface comprising a foundation, said system comprising:
   a shaft comprising:
      a post with a first face, a second face, and a fixing end, the post being configured to be placed vertically on the support surface,
      a plurality of pairs of bolts distributed such that each bolt of the plurality of pairs of bolts is fixed on either the first face or second face of the post,
      a flange located at the fixing end of the post and being fixed on the support surface,
   a plurality of pairs of tendons, each tendon comprising:
      a lower anchoring embedded in the foundation,
      an upper anchoring,
      at least one strand, each one of the at least one strand having a first end and a second end, the strand extending from the upper anchoring to the lower anchoring,
      a pair of sleeves for each one of the at least one strand, a first sleeve of the pair of sleeves fixed to the upper anchoring and a second sleeve of the pair of sleeves fixed to the lower anchoring, the first sleeve and the second sleeve housing a segment of the each one of the at least one strand, and
      a foundation cage covering at least a part of each one of the at least one strand and a part of the upper anchoring, and embedding the plurality of pairs of bolts.

2. The system according to claim 1, wherein the upper anchoring or the lower anchoring of each tendon of the plurality of pairs of tendons comprises:
   at least one distribution plate comprising a perforation, each one of the pair of sleeves housed in said perforation,
   at least one wedge plate comprising at least one hole housing the first end or second end of the at least one strand, the wedge plate arranged on the at least one distribution plate such that the perforation coincides with the at least one hole,
   at least one wedge housed in the hole which fixes the first end or the second end of the at least one strand to the wedge plate,
   at least one retention plate arranged on the at least one wedge plate, which has projecting therefrom the first end or the second end of the strand and which retains the at least one wedge, and
   at least one sealing gasket for fixing the at least one retention plate to the at least one wedge plate.

3. The system according to claim 2, wherein at least one upper anchoring or lower anchoring further comprises:
   a cap covering the first end or the second end of the at least one strand projecting from the at least one retention plate.

4. The system according to claim 2, wherein at least one of the tendon of the plurality of pairs of tendons further comprises a helix partially surrounding the at least one strand.

5. The system according to claim 4, wherein the helix is fixed to the at least one distribution plate on a face opposite to the at least one wedge plate.

6. The system according to claim 1 further comprising a mortar bed between the flange located at the fixing end of the post and the support surface.

7. The system according to claim 1, wherein the post is a metal post.

8. The system according to claim 1, wherein the plurality of pairs of bolts are metal bolts.

9. The system according to claim 1, wherein the plurality of pairs of bolts and the flange are welded to the post.

10. The system according to claim 1, wherein the each one of the at least one strand is formed by a plurality of wires.

11. A method for connecting the shaft of the wind tower to the support surface of the connection system according to claim 1, comprising:
   providing an excavation on the support surface adapted for making the foundation,
   fixing the lower anchoring of each tendon of the plurality of pairs of tendons into the excavation,
   pouring concrete into the excavation thereby obtaining the foundation,
   placing the shaft on the foundation,
   placing the upper anchoring together with the first end and the second end of the each one of the at least one strand in a final position of connection,
   making the foundation cage, and
   stressing the at least one tendon.

12. The method for connecting the shaft of the wind tower to the support surface according to claim 11, wherein the system further comprises a mortar bed between the flange located at the fixing end of the post and the support surface, and wherein after the step of placing the shaft on the foundation the following step is performed:
   making the mortar bed between the flange and the support surface.

13. The method for connecting the shaft of the wind tower to the support surface according to claim 11, wherein the upper anchoring or the lower anchoring of each tendon of the plurality of pairs of tendons comprises:

at least one distribution plate comprising a perforation, each one of the pair of sleeves housed in said perforation, at least one wedge plate comprising at least one hole housing the first end or second end of the at least one strand, the wedge plate arranged on the at least one distribution plate such that the perforation coincides with the at least one hole, at least one wedge housed in the hole which fixes the first end or the second end of the at least one strand to the wedge plate, at least one retention plate arranged on the wedge plate, which has projecting therefrom the first end or the second end of the strand and which retains the wedge, and at least one sealing gasket for fixing the at least one retention plate to the at least one wedge plate, and wherein the step of locating the upper anchoring together with the first end and the second end of the at least one strand comprises:

placing each tendon of the plurality of pairs of tendons and the at least one distribution plate, and placing the at least one wedge plate and the at least one wedge.

14. The method for connecting the shaft of the wind tower to the support surface according to claim 11, wherein the foundation further comprises a rebar, and the upper anchoring or the lower anchoring is fixed to the rebar of the foundation.

15. The system according to claim 1, wherein the at least one strand is made of steel.

\* \* \* \* \*